Patented Feb. 26, 1946

2,395,504

UNITED STATES PATENT OFFICE 2,395,504

COPOLYMERIZATION MIXTURES AND POLYMERIC PRODUCTS

Louis C. Rubens and Raymond F. Boyer, Midland, Mich., assignors to The Dow Chemical Company, Midland, Mich., a corporation of Michigan No Drawing. Application January 7, 1943, Serial No. 471,568

15 Claims. (Cl. 260—23)

This invention concerns certain new mixtures of polymerizable unsaturated organic compounds, which mixtures may be polymerized at an extremely rapid rate to obtain polymeric products that are not unduly brittle or fragile and that do not tend to shatter on long standing. The invention also concerns the new copolymer products obtained by polymerizing such mixtures.

It is well known that both the molecular weight and the physical properties, particularly the toughness or brittleness, of the solid polymers of unsaturated organic compounds, e. g., styrene, methyl methacrylate, ethyl acrylate, etc., are dependent to a large extent upon the conditions under which the polymerization reaction to form such solids is carried out. In most instances an increase in the rate of polymerization, e. g., by raising the reaction temperature or by employing a polymerization catalyst, results in a lowering of the molecular weight of the polymer product and in a tendency for the product to be brittle and fragile rather than tough. For instance, polystyrene which has been prepared by polymerizing styrene to a solid in less than 3 hours is highly brittle and often cracks or shatters without being struck a blow after standing for some time. In order to obtain the usual tough form of polystyrene the polymerization is carried out slowly, e. g., at temperatures between 80° and 170° C., over a period of several days while taking precautions to avoid overheating of the mixture due to the heat of reaction.

There is considerable need for a liquid polymerizable mixture which may rapidly be polymerized en masse to obtain a solid polymer that is not excessively brittle or fragile and which does not shatter on standing. In particular, there is need for such polymerizable mixture which, though polymerized rapidly, will yield a non-brittle solid polymer possessing good dielectric properties. It is an object of this invention to provide such polymerizable mixtures and also to provide the new non-brittle polymeric products. Other objects will be apparent from the following description of the invention:

We have discovered that mixtures of monovinyl aromatic compounds and dehydrated castor oil, containing from 10 to 35 per cent of the latter based on the combined weight of said ingredients, may be polymerized to obtain polymeric products which are not unduly brittle or fragile and which do not shatter on standing, regardless of the rate at which the polymerization reaction is carried out. Such mixtures have been polymerized to non-brittle solids in as short a time as five minutes.

Examples of monovinyl aromatic compounds which may be employed as ingredients of the polymerizable mixture are styrene, ortho-methyl - styrene, para - methyl - styrene, ortho-ethyl-styrene, meta-ethyl-styrene, para-ethyl-styrene, para-isopropyl-styrene, ortho-chloro-styrene and para-chloro-styrene, etc.

The dehydrated castor oil is a well known substance which is marketed under a variety of trade names, such as, "Isoline," "Dehydrol," "Synthenol," and "Castolene," etc. The preparation, composition and certain of the uses for dehydrated castor oil are described by Priest et al., Ind. Eng. Chem. 32 1314 (1940) and Killeffer, ibid. 32 1466 (1940). According to the first of these references, important ingredients of dehydrated castor oil are 9, 11- and 9, 12-linoleic acid in esterified form. Recent analysis of samples of commercially available dehydrated castor oil indicate that partial dehydrogenation as well as dehydration of the castor oil may have occurred during preparation of the product.

The polymerization of a mixture of a monovinyl aromatic compound and dehydrated castor oil in the proportions above stated may be accomplished by mere heating of the mixture, in which case the reaction occurs more rapidly as the reaction temperature is raised. Such thermal polymerization in the absence of catalysts is usually carried out at temperatures between 70° and 225° C. The rate of polymerization may, of course, be accelerated by the employment of a polymerization catalyst. A variety of catalysts which may be employed in the process, e. g. stannic chloride, benzoyl peroxide, boron trifluoride, acid-activated bleach earths, etc., are well known. By employing such catalyst, the polymerization reaction may in many instances be initiated at room temperature and be carried to a point at which the mixture is solidified within five minutes from the start of the reaction. During the reaction the temperature rises spontaneously, in some instances to as high as 200° C.

The rate of reaction is, of course, dependent upon the temperature at which the polymerization is carried out and upon the kind and proportion of catalyst, if any, employed in the reaction. For instance, upon adding to the mixture of polymerizable compounds 0.1 per cent by weight of anhydrous stannic chloride, the polymerization is initiated at room temperature and proceeds at such rate as to render the mixture solid after about two days of standing. When a mixture of the polymerizable compounds is treated with 7 per cent by weight of stannic chloride, a rapid polymerization takes place immediately and the mixture solidifies in about five minutes. During the rapid reaction which takes place the temperature may rise spontaneously from room temperature to about 150°–200° C. The catalyst may, of course, be used in smaller or larger proportions than those just mentioned. The optimum proportion of catalyst depends upon the kind of catalyst employed, the temperature at which the reaction is initiated, and the rate of reaction desired.

When the mixture of a monovinyl aromatic compound and dehydrated castor oil is polymerized in the absence of a catalyst or other added ingredient, the copolymer product possesses excellent dielectric properties comparable to those of fused quartz or polystyrene. It is well suited to use as an electric insulating material. When a catalyst or other non-essential ingredient is added prior to carrying out the polymerization the dielectric properties of the polymeric product are, of course, largely dependent upon those of the ingredients thus added. We have found, surprisingly, that stannic chloride not only is a highly effective catalyst for promoting rapid polymerization of the starting mixture, but that it does not seriously impair the dielectric properties of the polymerized product. Accordingly, although any of the usual polymerization catalysts may be employed in the process, stannic chloride is preferred.

When desired other non-essential ingredients, e. g., polymerization inhibitors, dyes, pigments, plasticizers, fillers, etc., may be added prior to carrying out the polymerization. In practice, a mixture of the monovinyl aromatic compound and the dehydrated castor oil is frequently treated with a small proportion of a polymerization inhibitor so as to stabilize the mixture against polymerization at room temperature or thereabout during storage or shipment. A variety of inhibitors, e. g., hydroquinone, quinone, catechol, tertiary-butyl-catechol, pyrogallol, etc., which may be employed for the purpose, are well known. Only a very small proportion, e. g., less than 0.05 per cent and usually less than 0.005 per cent, of an effective polymerization inhibitor is required in order satisfactorily to stabilize the mixture of monovinyl aromatic compound and dehydrated castor oil at room temperature. Upon subsequently heating the mixture, or upon treating it with a polymerization catalyst, it may be polymerized almost as readily and rapidly as in the absence of the inhibitor.

It should also be mentioned that the initial treatment of the polymerizable mixture with certain fillers such as ground quartz, etc., results in an increase in the tensile strength of the polymer product. When desired plasticizers, in amount about up to 20–30 per cent of the combined weight of polymerizable ingredients may be added prior to the polymerization, but the use of a plasticizer in larger proportions is not recommended when a solid polymeric product having good strength characteristics is desired. It will be understood that when the copolymer product is to be employed as an electric insulating material any non-essential ingredients added should be carefully selected so as not to impair seriously the dielectric properties of the product.

The liquid polymerizable mixtures provided by the invention meet certain important industrial needs. For example, such mixture may be poured into an electrical device containing fine metal filaments as conductors and be polymerized in situ within the device so as to form a solid mass of the copolymer product having the conductors imbedded therein. In such instance, the polymeric product not only serves to insulate the conductors and to hold the same in the desired positions relative to one another, but it also protects the conductors against breakage due to handling. Another mode of employing the liquid polymerizable mixture for electric insulating purposes is to wet a tape or other fibrous material with the mixture, wrap or otherwise apply the same to the electric conductor, e. g., a cable joint, which is to be insulated, and thereafter to polymerize the liquid mixture with which the fibrous material is impregnated. Due to the rapid rate at which the polymerizable mixture may satisfactorily be polymerized, these operations may be completed in only a short time, e. g., in less than 0.5 hour.

There is still another important use for the liquid polymerizable mixtures which are provided by the invention. It has been found that pin holes, pores and other minor defects in metal castings, and particularly in castings made of magnesium alloys, may be filled by dipping the castings in the liquid polymerizable mixture and thereafter warming the castings to polymerize the mixture. The minor defects in the castings are thereby filled with the polymeric product and a smooth impervious surface is obtained. In this way, many castings which have heretofore been regarded as defective may be rendered serviceable for the intended purpose and the loss of castings as discards is reduced markedly.

The following examples illustrate certain ways in which the principle of the invention have been applied, but are not to be construed as limiting the invention.

EXAMPLE 1

In a series of experiments, the polymerizable compound or compounds named in the following table in the relative proportions also given were treated with anhydrous stannic chloride in the amount indicated, whereupon a rapid polymerization reaction occurred. The time necessary for the reaction to proceed to a point at which the mixture was solid and also the properties of the resultant polymer product were observed. The table gives the proportions of styrene and of dehydrated castor oil employed in each experiment as per cent of the combined weight of these ingredients and it gives the proportion of stannic chloride as per cent of the total weight of the polymerizable compounds. It also gives the approximate time required for the mixture to polymerize to a solid and it includes a description of the polymerized product. It may be mentioned that the polymerization reaction is highly exothermic and that although it was in each of these experiments initiated by adding the stannic chloride at room temperature, the mixture heated spontaneously in some instances to temperatures as high as 150–200° C.

propyl-styrene, or para-chloro-styrene, etc. Also, a mixture of dehydrated castor oil with two or more of such monovinyl aromatic compounds may be employed provided the dehydrated castor oil Table I

| Run No. | Polymerizable mixture | | | Polymerization time | Product |
|---|---|---|---|---|---|
| | Styrene, percent | Dehydrated castor oil, percent | SnCl₄, percent | | |
| 1 | 100 | | 0.5 | 20–30 min | Yellow, hard, brittle and fragile. |
| 2 | 100 | | 1.0 | 15 min | Do. |
| 3 | 100 | | 2.0 | 5–10 min | Badly discolored, brown, hard, brittle and fragile. |
| 4 | 90 | 10 | 1.0 | 45 min | Hard and fairly brittle; of uniform brown color. |
| 5 | 80 | 20 | 1.0 | 1 hr | Brown, quite soft; in 24 hrs. became rubbery; and after 1 mo. was hard, but not brittle. |
| 6 | 70 | 30 | 1.0 | Very viscous in 1 hr.; extremely viscous in 1 day; and a tough rubbery solid in 5 days. | Permanently rubbery solid of brown color; product is swelled by benzene. |
| 7 | 60 | 40 | 3.0 | In 3½ hrs. ⅔ of the mixture was a viscous brown liquid and ⅓ was a gummy brown solid. | Non-uniform. |
| 8 | 40 | 60 | 3.0 | In 3½ hrs. ⅔ of the mixture was a mobile brown liquid and ⅓ was a gummy brown solid. | Do. |
| 9 | | 100 | 7.0 | In 3½ hrs. ⅔ was a free flowing viscous liquid and ⅓ was a semi-solid brown gel. | Do. |

In the above table it will be noted that the rapid polymerization of styrene alone yielded an unsatisfactorily brittle and fragile product, and that the mixtures of styrene and dehydrated castor oil containing 40 per cent or more of the latter yielded a non-uniform mixture of liquid and gummy products. On the other hand the mixtures of styrene and dehydrated castor oil, containing from 10 to 30 per cent of the latter, yielded uniform solid polymeric products which were not unduly brittle or fragile, which do not shatter on long standing, and which in some instances were quite rubbery. About 35 per cent of dehydrated castor oil, based on the combined weight of the polymerizable ingredients, is the maximum proportion that may satisfactorily be used and from 10 to 30 per cent of dehydrated castor oil is preferred.

EXAMPLE 2

In each of a series of experiments a mixture of styrene and dehydrated castor oil, in the proportions indicated in Table II, was polymerized by heating the same at 100° C. for 3 days. No catalyst was employed. The table gives the per cent by weight of styrene and of dehydrated castor oil employed in each experiment and describes the product obtained by the polymerization reaction.

Table II

| Run No. | Polymerizable Mixture | | Product |
|---|---|---|---|
| | Styrene, percent | Dehydrated castor oil, percent | |
| 1 | 90 | 10 | A fairly flexible opaque white solid. |
| 2 | 80 | 20 | A fairly soft opaque white solid which is quite flexible. |
| 3 | 70 | 30 | A very flexible opaque white solid. |
| 4 | 60 | 40 | A non uniform mixture, ⅓ of which is a dark brown oil and ⅔ of which is semi-solid. |
| 5 | 40 | 60 | A non-uniform mixture; ⅔ is a dark brown liquid and ⅓ is semi-solid. |
| 6 | 20 | 80 | Entirely liquid. |
| 7 | 00 | 100 | Do. |

Examples of other mixtures of monovinyl aromatic compounds and dehydrated castor oil, containing between 10 and 35 per cent by weight of the latter, which may be employed in place of those mentioned in the foregoing examples are the mixtures of dehydrated castor oil with ortho-methyl-styrene, para-methyl-styrene, para-iso-propyl-styrene, or para-chloro-styrene, etc. Also, a mixture of dehydrated castor oil with two or more of such monovinyl aromatic compounds may be employed provided the dehydrated castor oil is used in amount corresponding to between 10 and 35 per cent of the combined weight of the polymerizable compounds.

Other modes of applying the principle of the invention may be employed instead of those explained, change being made as regards the method or products herein disclosed, provided the steps or ingredients stated by any of the following claims or the equivalent of such stated steps or ingredients be employed.

We therefore particularly point out and distinctly claim as our invention:

1. A liquid polymerizable mixture comprising as its essential ingredients between 65 and 90 per cent of at least one monovinyl aromatic compound and between 10 and 35 per cent of dehydrated castor oil, based on the combined weight of these ingredients.

2. A liquid polymerizable mixture comprising between 65 and 90 per cent of at least one monovinyl aromatic compound, between 10 and 35 per cent of dehydrated castor oil, said proportions being based on the combined weight of the polymerizable ingredients, and a polymerization inhibitor in a minor proportion sufficient to stabilize the mixture in the absence of a catalyst at room temperature but permit rapid polymerization by means of catalysts and heat.

3. A liquid polymerizable mixture consisting essentially of from 70 to 90 per cent of at least one monovinyl aromatic compound and from 10 to 30 per cent of dehydrated castor oil, based on the combined weight of these ingredients.

4. A liquid polymerizable mixture comprising from 70 to 90 per cent of at least one monovinyl aromatic compound and from 10 to 30 per cent of dehydrated castor oil, based on the combined weight of these ingredients, and also containing a minor amount of a polymerization inhibitor sufficient to stabilize the mixture in the absence of catalyst at room temperature but permit rapid polymerization in the presence of a catalyst and at elevated temperatures.

5. A liquid polymerizable mixture comprising as its essential ingredients between 65 and 90 per cent of styrene and between 10 and 35 per cent of dehydrated castor oil, based on the combined weight of these ingredients.

6. A liquid polymerizable mixture comprising from 70 to 90 per cent of styrene and from 10 to 30 per cent of dehydrated castor oil, based on the combined weight of these ingredients.

7. A liquid polymerizable mixture comprising from 70 to 90 per cent of styrene and from 10 to 30 per cent of dehydrated castor oil, based on the combined weight of these ingredients, and also containing a polymerization inhibitor in a small proportion sufficient to stabilize the mixture against polymerization at room temperature in the absence of a catalyst but permit rapid polymerization of the mixture in the presence of a catalyst and at elevated temperatures.

8. A non-brittle polymeric product obtained by polymerizing a mixture of between 65 and 90 per cent of at least one monovinyl aromatic compound and between 10 and 35 per cent of dehydrated castor oil, based on the combined weight of these ingredients.

9. A non-brittle solid polymeric product obtained by polymerizing a mixture of from 70 to 90 per cent of at least one monovinyl aromatic compound and from 10 to 30 per cent of dehydrated castor oil.

10. A non-brittle solid polymeric product obtained by polymerizing a mixture of between 65 and 90 per cent of styrene and between 10 and 35 per cent of dehydrated castor oil, based on the combined weight of these ingredients.

11. A non-brittle solid polymeric product obtained by polymerizing a mixture of from 70 to 90 per cent of styrene and from 10 to 30 per cent of dehydrated castor oil, based on the combined weight of these ingredients.

12. A non-brittle solid polymeric product obtained by polymerizing a mixture of from 70 to 90 per cent of styrene and from 10 to 30 per cent of dehydrated castor oil, based on the combined weight of these ingredients, which mixture also comprises powdered quartz dispersed throughout the same.

13. A method for rapidly producing a non-brittle polymeric product which comprises adding a polymerization catalyst to a mixture of between 65 and 90 per cent of at least one monovinyl aromatic compound and between 10 and 35 per cent of dehydrated castor oil, based on the combined weight of these polymerizable ingredients.

14. A method for the rapid formation of a non-brittle solid polymeric product, which comprises adding a polymerization catalyst to a mixture of between 65 and 90 per cent of styrene and between 10 and 35 per cent of dehydrated castor oil, whereby the mixture is caused to polymerize rapidly to a solid.

15. A method for the rapid production of a non-brittle solid polymeric product which comprises adding stannic chloride to a mixture of from 70 to 90 per cent of styrene and from 10 to 30 per cent of dehydrated castor oil, whereby the mixture is caused to polymerize rapidly and become solid.

LOUIS C. RUBENS.
RAYMOND F. BOYER.